United States Patent [19]

Lee

[11] Patent Number: 5,254,999

[45] Date of Patent: Oct. 19, 1993

[54] VIDEO SIGNAL PROCESSOR FOR RADAR SYSTEM

[75] Inventor: Sang-yoon Lee, Seoul, Rep. of Korea

[73] Assignee: SamSung Electronics Co., Ltd., Suwon, Rep. of Korea

[21] Appl. No.: 8,565

[22] Filed: Jan. 22, 1993

[51] Int. Cl.$^5$ .................... G01S 7/298; G01S 13/66
[52] U.S. Cl. .................... 342/197; 342/92; 342/93; 342/95; 342/185
[58] Field of Search .......... 342/175, 185, 195, 196, 342/197, 205, 159, 162, 90, 91, 92, 93, 95, 96, 97

[56] References Cited

U.S. PATENT DOCUMENTS

| | | | |
|---|---|---|---|
| 3,946,382 | 3/1976 | Kossiakoff et al. | 342/93 |
| 3,995,270 | 11/1976 | Perry et al. | 342/91 |
| 3,995,271 | 11/1976 | Goggins, Jr. | 342/91 |
| 4,040,052 | 8/1977 | Stanislaw . | |
| 4,242,682 | 12/1980 | Musha et al. | 342/93 |
| 4,330,781 | 5/1982 | Giustiniani et al. . | |
| 4,386,353 | 5/1983 | Beijerveld et al. | 342/91 |
| 4,586,043 | 4/1986 | Wolf | 342/93 |
| 4,958,141 | 9/1990 | Engelsman | 340/146.2 |
| 4,970,660 | 11/1990 | Marchant | 364/517 |

Primary Examiner—John B. Sotomayor
Attorney, Agent, or Firm—Robert E. Bushnell

[57] ABSTRACT

A video signal processor for a radar system includes A/D converters for receiving radar signals to digitize the signals at a predetermined speed, direct averagers for writing signals included in the predetermined size of azimuth among the digitized radar signals into different memories according to the azimuths and for averaging signals corresponding to the same range gates, cell average processors having a microcomputer and a RAM for cell-averaging the output of the direct averagers with the processing program down-loaded from a main controller, an extractor for extracting only target data from the output of one of the cell average processors, a radar video processor controller for generating various control signals, and a communication processor for performing the data transmission and reception between the main controller and the radar video processor controller of the radar system.

14 Claims, 8 Drawing Sheets

VIDEO SIGNAL PROCESSOR FOR RADAR SYSTEM

BACKGROUND OF THE INVENTION

The present invention relates to a radar system, and particularly to a video signal processor for extracting video data from a radar signal which is input from an antenna and is pre-processed.

Figure 1:
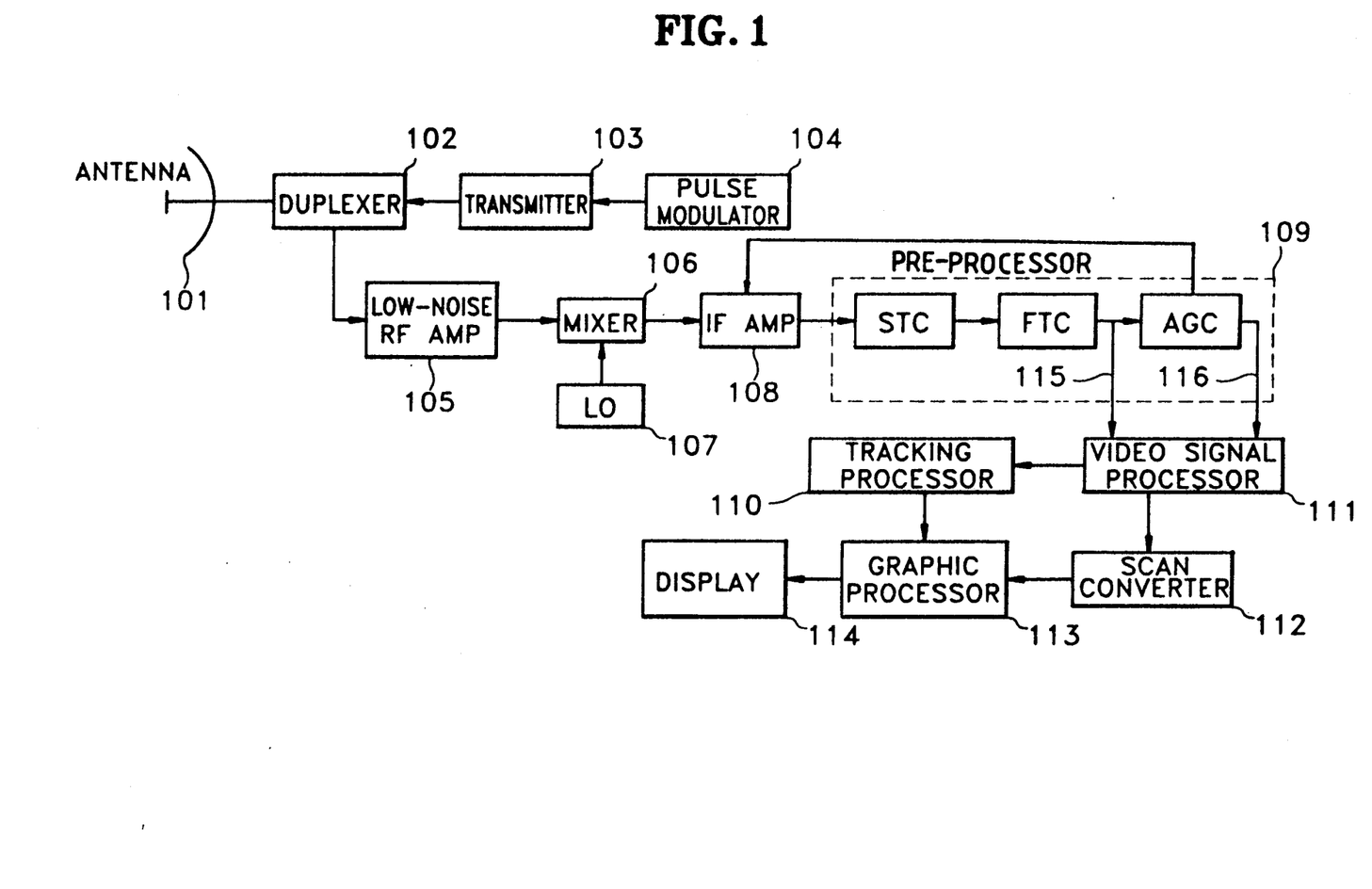
FIG. 1 is a block diagram of a general radar system.

Radar systems transmit an electromagnetic wave in a specific form, such as a pulse-modulated sine wave, and detect the properties of a reflected signal FIG. 1 is a block diagram for describing a general radar system.

Referring to FIG. 1, an antenna 101 is time-division-operated to emit radio waves in a specific form and to receive the reflected waves. A pulse modulator 104 generates the radio waves in a specific form, that is, as a pulse-modulated sine wave. The radio wave generated from pulse modulator 104 is applied to antenna 101 via a transmitter 103 and a duplexer 102 and is emitted into the atmosphere via antenna 101. Here, duplexer 102 functions to switch the modes of antenna 101. Antenna 101 is used as a transmitting antenna for a predetermined period and then as a receiving antenna for another predetermined period. That is, antenna 101 is set to a transmitting mode for the first predetermined period and is then set to a receiving mode for the other predetermined period by duplexer 102. Meanwhile, the received reflected wave is applied to a mixer 106 via a low-noise RF amplifier 105. Mixer 106 mixes a local oscillating signal generated from a local oscillator 107 and the output signal of low-noise RF amplifier 105, so as to convert the output signal of low-noise RF amplifier 105 to an intermediate frequency (IF) signal. An IF amplifier 108 amplifies the output signal of mixer 106, with the gain of the amplifier being controlled according to a signal applied from an automatic gain controller (AGC) incorporated in a pre-processor 109. In a radar system, pre-processor 109 and a video signal processor 111 basically function to detect target data in the reflected (received) signal. Here, pre-processor 109 and video signal processor 111 perform various algorithms for maintaining a constant false alarm rate (CFAR).

Pre-processor 109 has a sensitivity time control portion (STC), a fast time constant portion (FTC), and an automatic gain control portion (AGC). The STC and FTC remove various types of clutter which are present in a received radar signal and the AGC controls the gain of IF amplifier 108. Here, pre-processor 109 applies a first radar signal 116 processed by all of STC, FTC and AGC and second radar signal 115 processed by only STC, FTC excluding AGC, to video signal processor 111.

Figure 2A:
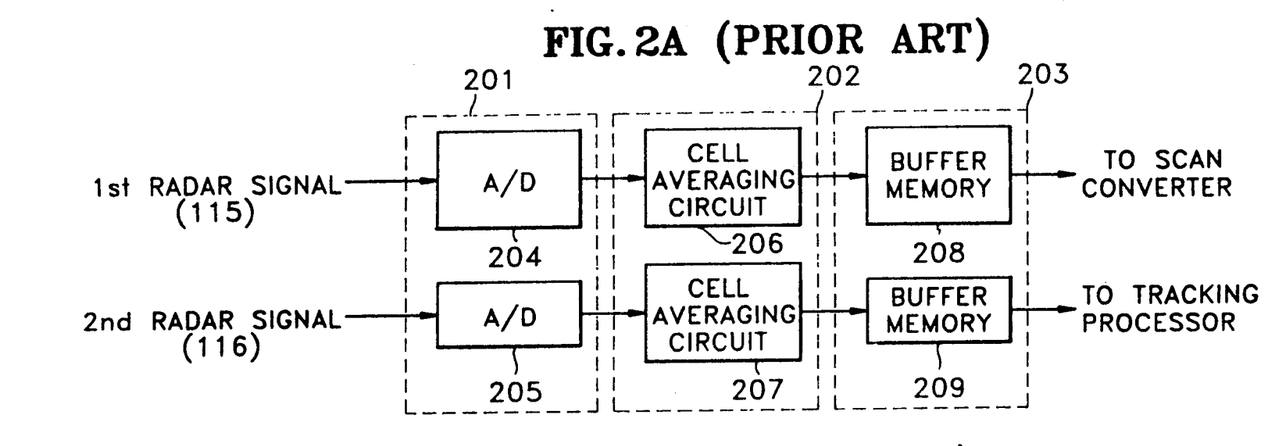
FIG. 2A is a block diagram of a conventional video signal processor for a radar system.

FIG. 2A is a detailed block diagram of a conventional video signal processor 111 for a radar system. The processor comprises an A/D converting portion 201, a cell-averaging circuit portion 202 and a buffer memory portion 203.

In FIG. 2A, A/D converting portion 201 converts the first and second radar signals 115 and 116 of analog into the first and second radar signals of digital using A/D converters 204 and 205, respectively. Here, the A/D converters are operated by a sampling clock of a specific frequency which is closely related to the range resolution. Therefore, in order to improve range resolution, A/D converters capable of performing higher-frequency sampling operations, are required. However, as the A/D converter's sampling clock frequency is tied to device characteristics, there is generally a maximum sampling clock frequency at which the A/D converter can operate stably. Therefore, in a conventional radar system, range resolution is limited by the maximum frequency of the sampling clock at which an adopted A/D converter can be operated.

Cell averaging circuit portion 202 removes unknown background noise and background clutter from data output from A/D converters 204 and 205, and outputs the data to buffer memories 208 and 209. The cell averaging circuit portion adaptively sets a threshold value for determining whether a signal is target data or not. Here, the method for adaptively setting the threshold value is called cell averaging.

Buffer memories 208 and 209 store the output of cell averaging circuit portion 202 and output the stored data on demand of a scan converter or tracking processor. Here, the scan converter converts polar-coordinate video data stored in buffer memory 208 into rectangular-coordinate video data, and applies the converted data to a raster-scan-type display. The tracking processor calculates the speed and acceleration of a target using video data stored in buffer memory 209, so as to estimate the bearing of the target.

Figure 2B:
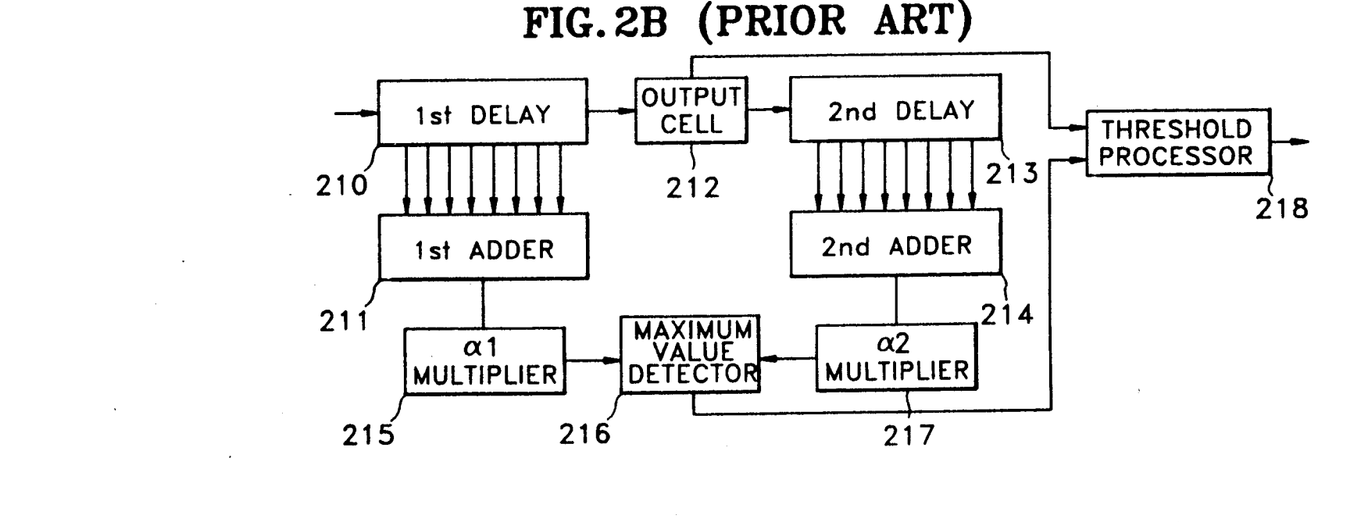
FIG. 2B is a detailed block diagram of the cell averaging circuit shown in FIG. 2A.

FIG. 2B is a detailed block diagram of the cell averaging circuit portion shown in FIG. 2A. The cell averaging circuit portion has a first delay line 210, a second delay line 213, an output cell 212, a first adder 211, a second adder 214, a first constant multiplier 215, a second constant multiplier 217, a maximum value detector 216 and a threshold value processor 218.

In FIG. 2B, first and second delay lines 210 and 213 are composed of series-connected delay devices. In the delay devices, from the reference of output cell 212, data corresponding to a previous range and data corresponding to a succeeding range are sequentially stored. The stored data is added in first and second adders 211 and 214, respectively. The output of first adder 211 is multiplied by a specific constant $\alpha 1$ in first constant multiplier 215, and the output of second adder 214 is multiplied by a specific constant $\alpha 2$ in second constant multiplier 217. Here, the constants $\alpha 1$ and $\alpha 2$ are varied according to the number of cells added by first and second adders 211 and 214 and the maximum data level regarded as a false target signal. Maximum value detector 216 detects the higher value between the outputs of first and second constant multipliers 215 and 217 and applies the detected value to threshold value processor 218 as a threshold value. Only when the data of output cell 212 is above the threshold value, threshold value processor 218 outputs the data as video data. When the data is not above the threshold value, the threshold value processor outputs non-signal data representing that no target exists.

As described above, in the conventional video signal processor, since the range resolution is limited according to the sampling clock frequency permitted by an A/D converter. Also, as cell averaging is performed via fixed form of hardware, multiplied constants and the number of added ranges cannot be adaptively adjusted according to the time-variant situation. The cell averaging circuit shown in FIG. 2B performs only one cell averaging algorithm, while a radar system is generally required to change the cell averaging algorithm itself according to the circumstances of the region to be detected.

SUMMARY OF THE INVENTION

Therefore, it is an object of the present invention to provide a video signal processor for a radar system which provides improved function.

To accomplish the object of the present invention, there is provided a video signal processor for a radar system having a pre-processor for outputting first and second radar signals by removing clutter via different methods, a tracking processor and a scan converter, comprising: first A/D converting means for receiving the first radar signal and performing analog-to-digital conversion at a predetermined conversion speed; first direct averaging means for writing signals included in predetermined size of azimuth among the digitized first radar signal into different memories according to the azimuth and for averaging signals corresponding to the same range gates to output; first cell average processing means having a microcomputer and a RAM for performing cell averaging the output of the first direct averaging means with the processing program down-loaded from a main controller of the radar system; second A/D converting means for receiving a second radar signal and performing analog-to-digital conversion at a predetermined conversion speed; second direct averaging means for writing signals included in predetermined size of azimuth among the digitized second radar signal into different memories according to the azimuth and for averaging signals corresponding to the same range gates to output; second cell average processing means having a microcomputer and a RAM for performing cell averaging the output of the second direct averaging means with the processing program down-loaded from a main controller of the radar system; extracting means for extracting target data from the output of the second cell average processing means; radar video processor controlling means commonly connected to each of the means for generating various control signals; and a communication processor connected to the radar video processor controlling means for performing the data transmission/reception between the main controller of the radar system and the radar video processor controlling means, the output of the first cell average processing means being applied to the scan converter and the output of the extracting means being applied to the tracking processor.

BRIEF DESCRIPTION OF THE DRAWINGS

The above object and other advantages of the present invention will become more apparent by describing in detail a preferred embodiment thereof with reference to the attached drawings in which.

DETAILED DESCRIPTION OF THE INVENTION

Figure 3:
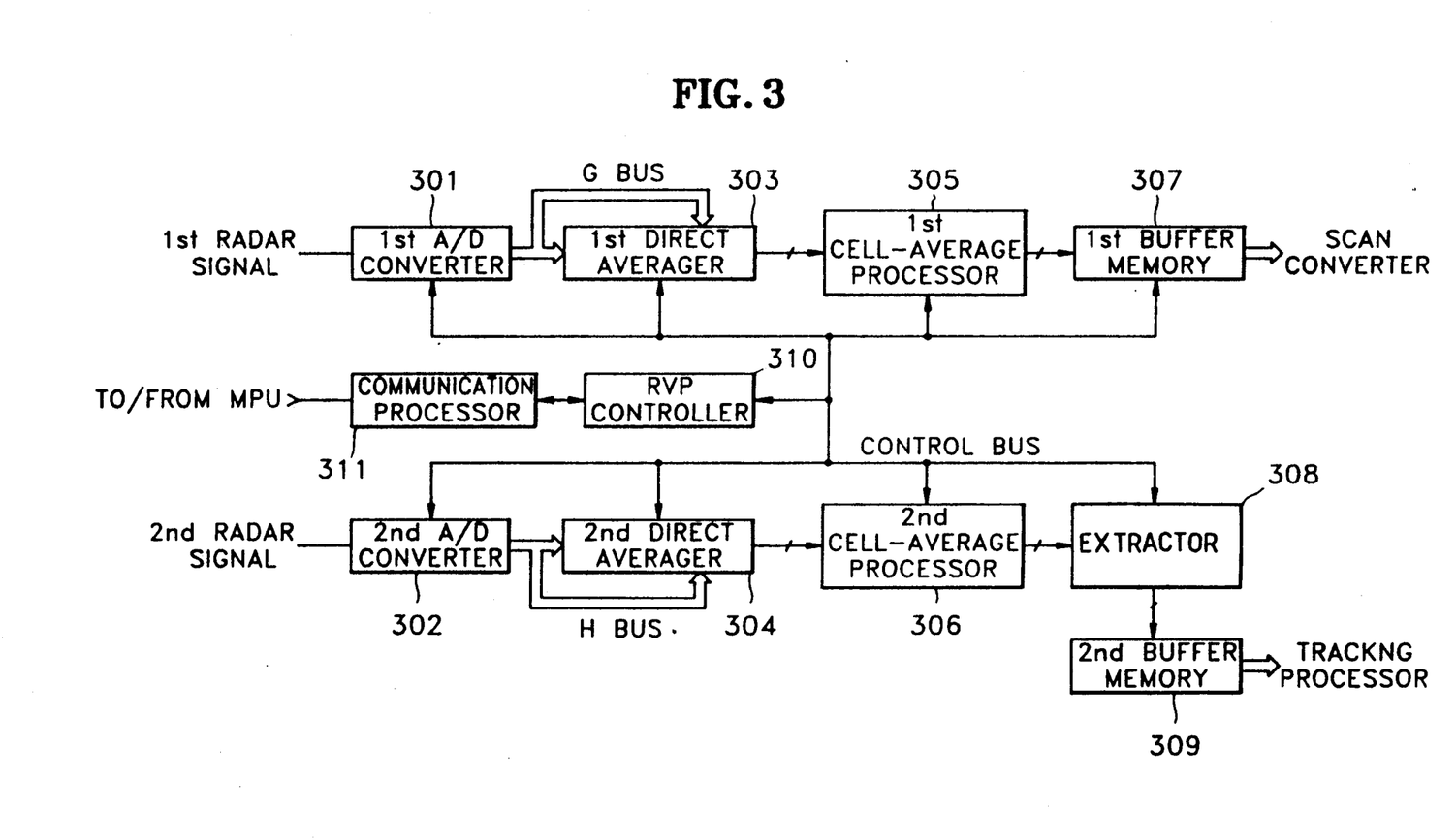
FIG. 3 is a block diagram of a video signal processor of a radar system according to the present invention.

Referring to FIG. 3, the video signal processor for a radar system comprises a first A/D converter 301, a second A/D converter 302, a first direct averager 303, a second direct averager 304, a first cell average processor 305, a second cell average processor 306, a first buffer memory 307, a second buffer memory 309, a target data extractor 308, a radar video processor controller 310, and a communication processor 311. The output of first A/D converter 301 is transmitted to first averager 303 via a G bus, and the output of second A/D converter 302 is transmitted to second direct averager 304 via an H bus.

In FIG. 3, first and second A/D converters 301 and 302 perform analog-to-digital conversion using a clock whose frequency is predetermined number of times, e.g., twice, of the sampling frequency allowed by A/D converting chip adopted. A more detailed description in this regard will follow referring to FIGS. 4 and 5.

First and second direct averagers 303 and 304 receive digitized data to average the data contained for a predetermined period by range gates, and then output the averaged data. Here, the predetermined period indicates a specific number of periods of a pulse repetition frequency (PRF) signal. The specific number is set in advance by the user or in accordance with a program. Thus, data received for the predetermined number of PRF periods is compressed into data received for one such period. The reason for performing such this operation is because the frequency of the PRF signal is, usually, high enough to extract more data than that displayed via displaying device. Such an operation of averaging by ranges carries out a function to prevent the erroneous pickup of a target due to sporadic noise, while performing simple data compression. A more detailed explanation about this will follow with reference to FIGS. 6, 7 and 8.

First and second cell average processors 305 and 306 perform cell averaging which is explained in the description of FIG. 2B. However, different from the conventional method, the cell averaging is carried out via software program and not by hardware means. Here, the software program is down-loaded from the main controller of the radar system to first and second cell average processors 305 and 306, via communication processor 311, thus enabling the user to change the software program. Target data extractor 308 removes non-signal data representing that no target exists from data output from second cell-averaging processor 306 and applies the data to second buffer memory 309. A more detailed explanation about this will follow with reference to FIG. 11.

Radar video processor controller 310 is connected to the respective circuits of a radar video processor to perform overall control functions. Particularly, the controller produces various clocks and control signals which are varied according to the conditions, e.g. PRF frequency, required resolution, . . . etc, in order to make the circuits adaptively perform their operation. Here, the various clocks and control signals produced by radar video processor controller 310 are transmitted to respective circuits via a control bus.

The A/D converters shown in FIG. 3 will be described below with reference to FIGS. 4 and 5.

Figure 4:
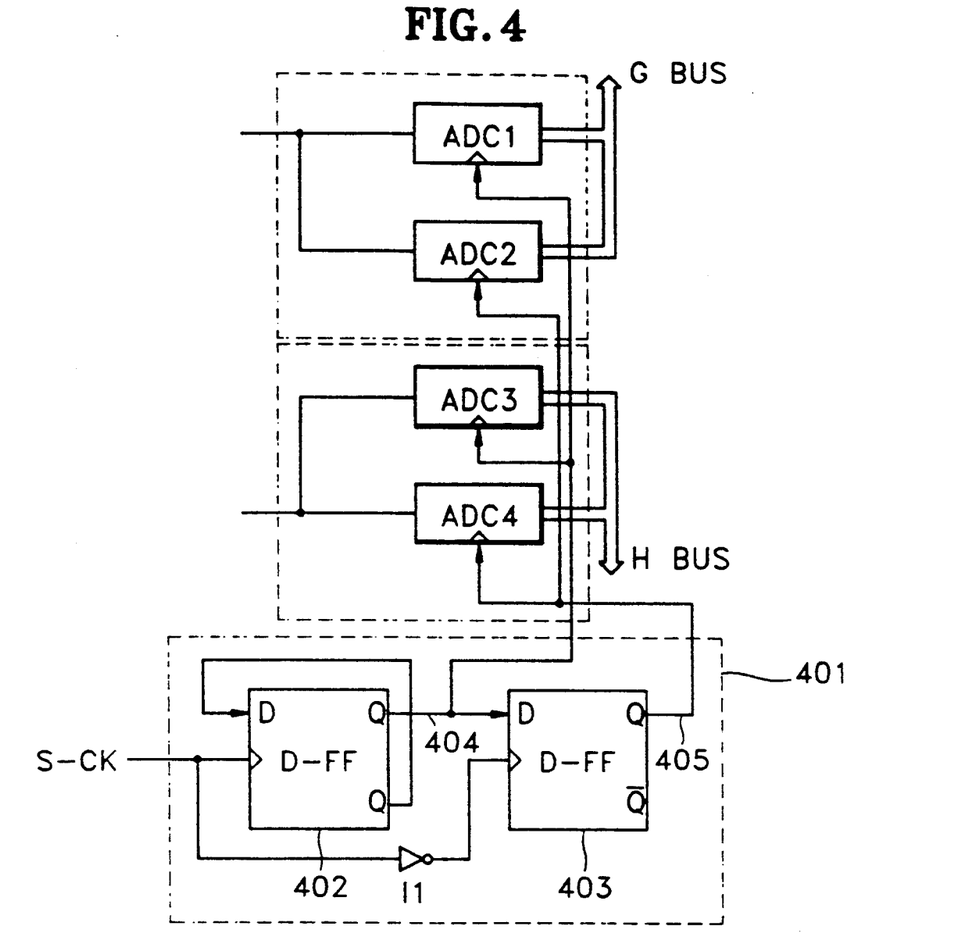
FIG. 4 is a detailed block diagram of the first A/D converter and the second A/D converter shown in FIG. 3.
Figure 5:
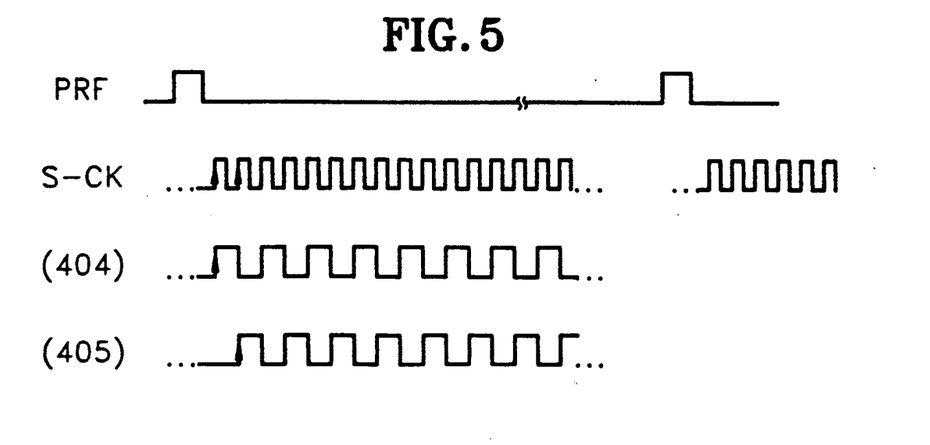
FIG. 5 illustrates the waveforms of clocks shown in FIG. 4.

FIG. 4 is a detailed block diagram of A/D converters 301 and 302 shown in FIG. 3. First A/D converter 301 comprises a first A/D converter chip (ADCI), a second A/D converter chip (ADC2) and a frequency dividing unit 401. Second A/D converter 302 comprises a third A/D converter chip (ADC3), a fourth A/D converter chip (ADC4) and frequency dividing unit 401. In FIG. 4, frequency dividing unit 401 is commonly used for first and second A/D converter 301 and 302. Frequency dividing unit 401 consists of a D flip-flop 402, a D flip-flop 403 and an inverter I1. Here, D flip-flops 402 and 403 function as frequency dividers which divide the frequency of sampling clock S-CK and the frequency of the inverted signal of sampling clock S-CK, respectively. The frequency of sampling clock S-CK is twice that of the clock used for first, second, third and fourth A/D converter chips (ADC1, ADC2, ADC3 and ADC4) during sampling. In other words, the frequency of sampling clock S-CK is twice the sampling frequency at which the employed A/D converter chip can perform analog-to-digital conversion. Sampling clock S-CK is modulated into a signal 404 and a signal 405 by frequency dividing unit 401. According to the modulated signal, first and third A/D converter chips (ADC1 and ADC3) perform analog-to-digital conversion at the edge of an odd pulse of sampling clock S-CK and second and fourth A/D converter chips ADC2 and ADC4 perform A/D conversion at the edge of an even pulse of sampling clock S-CK. Here, first and second A/D converter chips (ADC1 and ADC2) alternately transmit their outputs via the G bus. Third and fourth A/D converter chips (ADC3 and ADC4) alternately transmit their outputs via the H bus. FIG. 5 shows the waveforms of these signals.

Figure 6:
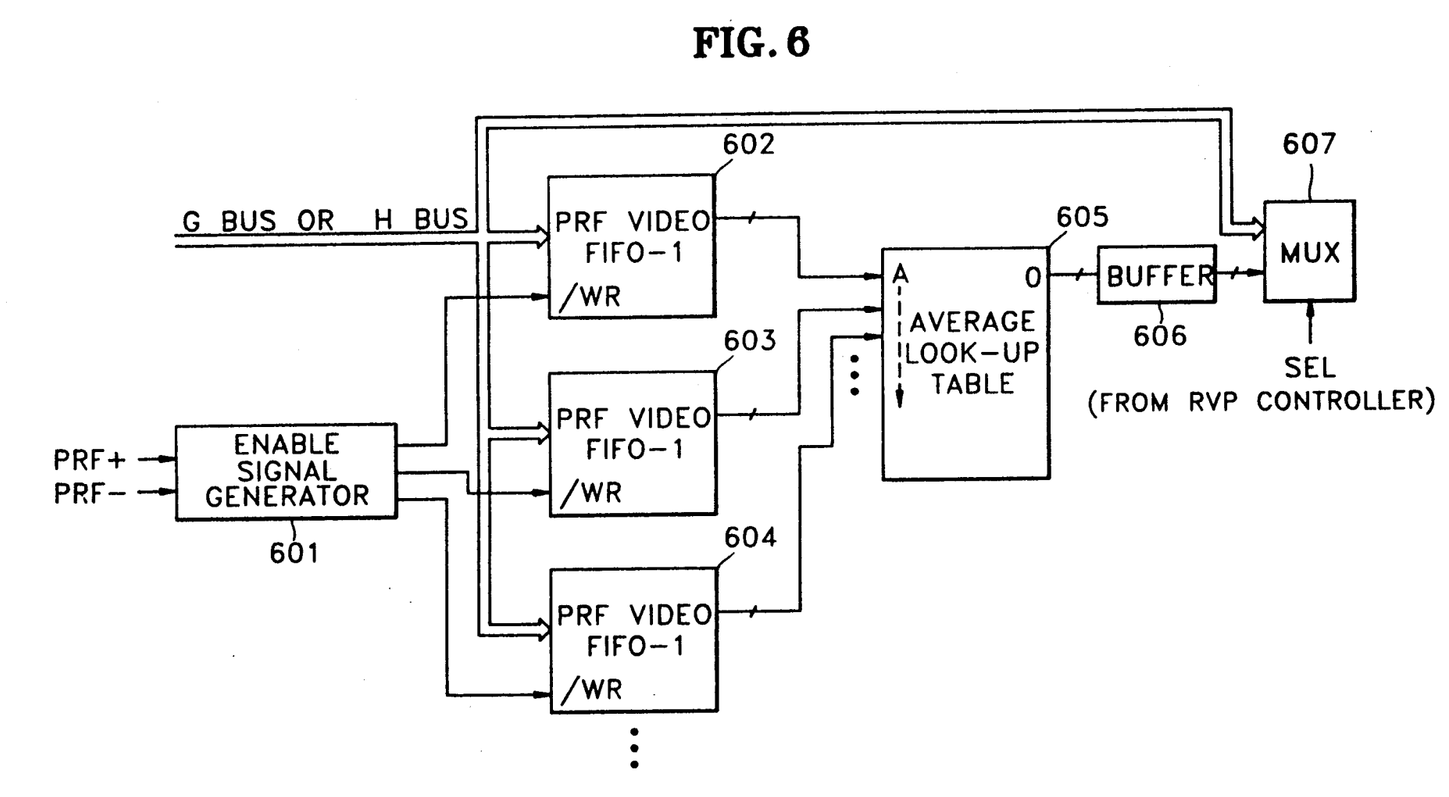
FIG. 6 is a detailed block diagram of the first or second direct averager shown in FIG. 3.

FIG. 6 is a block diagram of either of the first and second direct averagers shown in FIG. 3. The direct averager is composed of an enable signal generator 601, a plurality of PRF video first-in-first-out (FIFO) memories (PRF VIDEO FIFO-1, PRF VIDEO FIFO-2 and PRF VIDEO FIFO-3), an average look-up table 605, a buffer 606 and a multiplexer 607.

In FIG. 6, the plurality of PRF video FIFO memories are commonly connected to the G or H bus, sequentially store radar signals contained in one PRF period, and output the radar signals in the order of their storage. Specifically, a digitized radar signal is stored in PRF VIDEO FIFO-1 for one PRF period, is stored in PRF VIDEO FIFO-2 for the succeeding period and in PRF VIDEO FIFO-3 for the period after that. Here, the digitized radar signal is sequentially written in the respective PRF VIDEO FIFO memories, depending upon their ranges. During the period when the digital radar signal is written into PRF VIDEO FIFO-3, the radar signals stored in the respective PRF VIDEO FIFO memories are read out by range gates and are transmitted to average look-up table 605. In order to make PRF video FIFO memories operate as above, enable signal generator 601 generates a plurality of write clock signals applied to the respective memories. Enable signal generator 601 will be described in more detail by referring to FIG. 8.

Average look-up table 605 divides an address by a predetermined number of bits and stores the average value of the divided address. When an address is applied, the average value is immediately output. For instance, when the address of average look-up table 605 is composed of twelve bits and the outputs of PRF VIDEO FIFO-1, PRF VIDEO FIFO-2 and PRF VIDEO FIFO-3 each have four bits, the logic value stored in address "1101 1000 1111" is "1100". Since $[(1101)_2 + (1000)_2 + (1111)_2]/3 = ](100100)_2]/3 = (1100)_2$, $(1100)_2$ is stored in average look-up table 605 as the average address value. As described above, when an average value is calculated using a look-up table method, the calculation is carried out very fast.

Here, in order to enhance the detection capability, a radar system uses a PRF signal of various frequencies. The PRF frequencies are varied because, by varying the PRF frequencies, the return signal of a real target never fails to appear and that of a false target due to clutter or noise may or may not appear. Therefore, the radar system recognizes the return signal which always appears, as one having been reflected from a real target. Here, according to the PRF frequencies, the frequency of the sampling clock is varied, and the frequencies of first, second and third write clocks WR-CK1, WR-CK2 and WR-CK3 respectively applied to PRF VIDEO FIFO-1, PRF VIDEO FIFO-2 and PRF VIDEO FIFO-3 are in turn varied. When the frequency of the PRF signal is very low, averaging is not carried out by the PRF video FIFO memories, and only when the PRF frequency is high, direct averaging is carried out.

In FIG. 6, multiplexer 607 is connected to either the G bus or the H bus and is simultaneously connected to the output of average look-up table 602, so as to select the outputs of the first and second A/D converters transmitted via the G or H bus, or the output of buffer 606, according to the PRF frequency.

Figure 7:
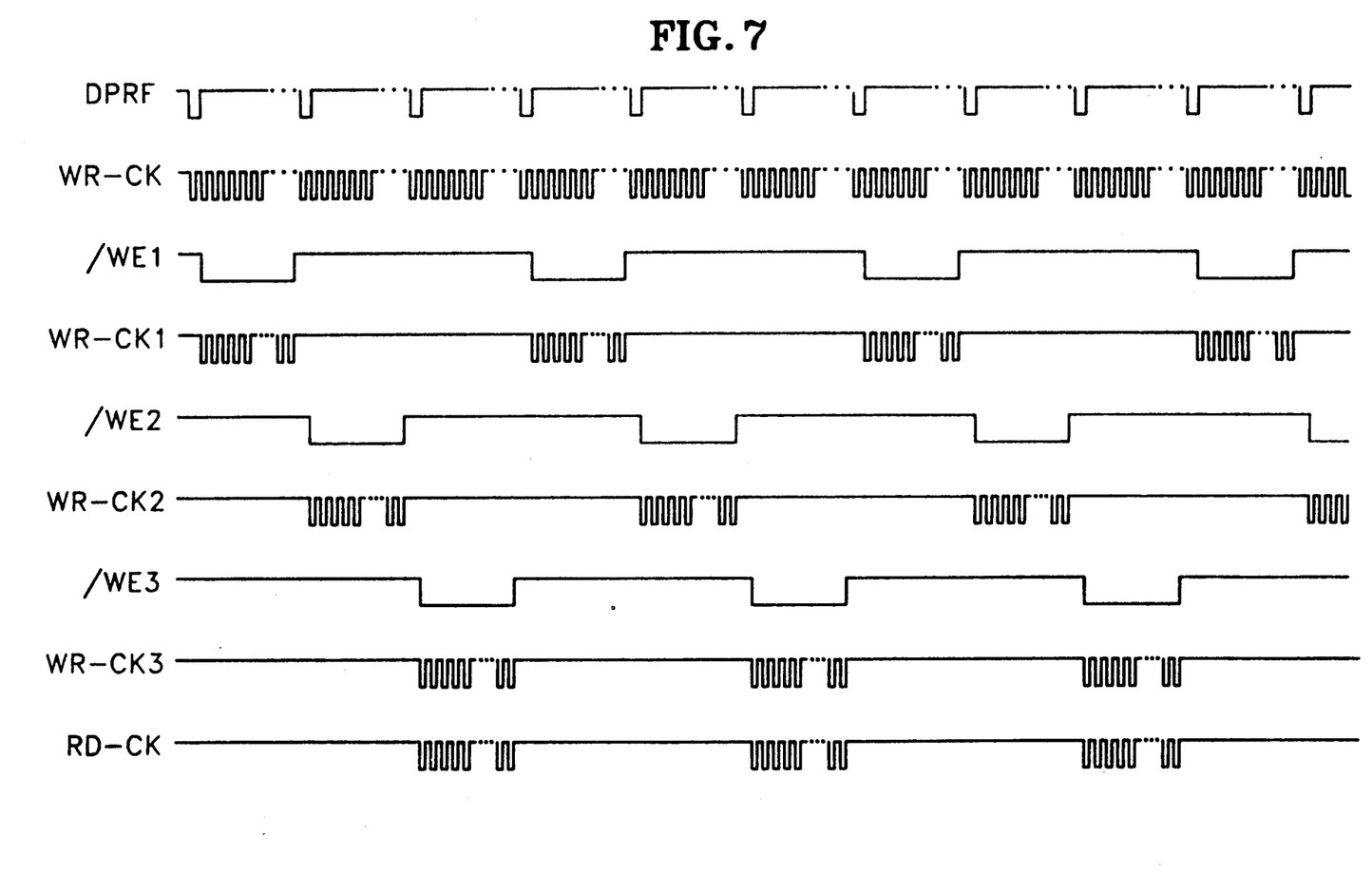
FIG. 7 illustrates the waveforms of signals shown in FIG. 6.

FIG. 7 are waveforms to explain the operation of the direct averager shown in FIG. 6. In FIG. 7, $-$DPRF represents an almost same signal as a negative PRF signal, that is, $-$PRF signal. In other words, $-$PRF signal is a negative PRF signal added with noise during transmission. $-$DPRF signal is a negative PRF signal whose noise is removed by a video signal processor.

In FIG. 7, /WE1, /WE2 and /WE3 are write enable signals which are respectively active while data can be written into PRF VIDEO FIFO-1, PRF VIDEO FIFO-2 and PRF VIDEO FIFO-3. Here, each of the write enable signals is AND-operated with write clock WR-CK applied from radar video processor controller 310, and is sent to respective write ports of PRF VIDEO FIFO-1, PRF VIDEO FIFO-2 and PRF VIDEO FIFO-3, while read clock RD-CK (FIG. 7) is applied to respective read ports thereof, as well as to the write port of buffer 606. Read clock RD-CK has the same form as that of the signal represented as the result when third write clock WR-CK3 applied to the write port of PRF VIDEO FIFO-3 is delayed for a predetermined number of clock periods. Therefore, after a predetermined number of clock pulses, since the first and second radar signals begin to be stored in PRF VIDEO FIFO-3, the average value according to the range gates is calculated and applied to buffer 606.

Figure 8:
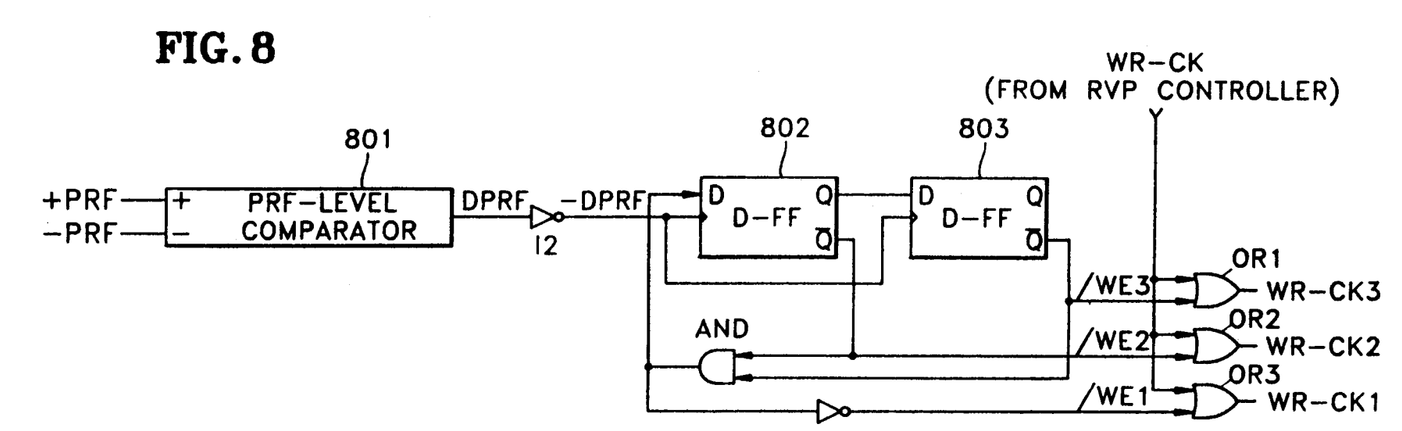
FIG. 8 is a detailed block diagram of the enable signal generator shown in FIG. 6.

FIG. 8 is a detailed block diagram of the enable signal generator shown in FIG. 6. The enable signal generator consists of a PRF-level comparator 801, an inverter I2, a D flip-flop 802, a D flip-flop 803, three OR gates OR1, OR2 and OR3, an AND gate AND, and an inverter I3.

In FIG. 8, PRF-level comparator 801 receives positive PRF signal +PRF and negative PRF signal −PRF both of which may contain noise, and compares the difference in the level of the two received signals with a specific value, so as to output a digital PRF signal DPRF.

Figure 9A:
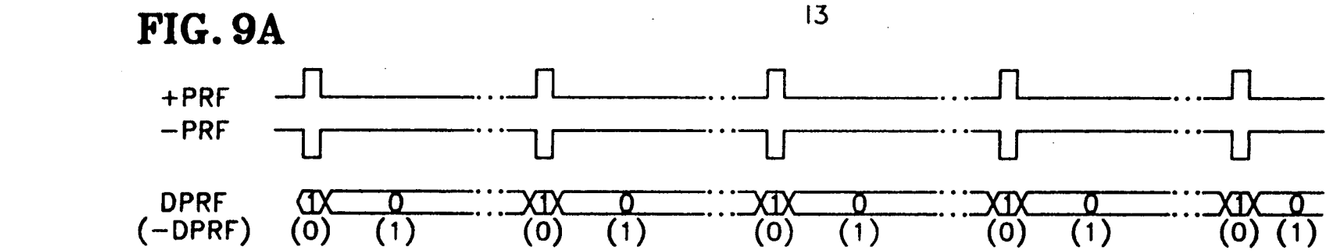
FIGS. 9A and 9B illustrate waveforms of input/output signals of PRF level comparator shown in FIG. 8.
Figure 9B:
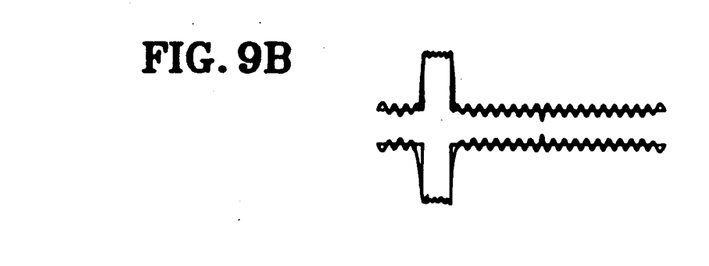

FIGS. 9A and 9B are waveforms to explain the function of PRF-level comparator 801. Here, positive PRF signal +PRF and negative PRF signal −PRF signal contain noise. FIGS. 9A and 9B show the positive and negative PRF signals +PRF and −PRF with and without noise, respectively. When a signal with noise is used without noise removal (as shown in FIG. 9B), errors are produced, therefore the noise should be removed. Basic principle of noise reduction is that a signal below a predetermined level is regarded as noise and output as a logic "0" and the remaining signal is not regarded as noise and is thus output as a logic "1". Here, the margin of determination can be widened by comparing the potential difference between the positive PRF signal and negative PRF signal with a specific voltage.

In FIG. 8, second inverter I2 inverts the DPRF signal output from PRF-level comparator 801 and applies the inverted signal to the clock ports of D flip-flops 802 and 803. D flip-flops 802 and 803, the AND gate and inverter I3 are components for generating write enable signals /WE1, /WE2 and /WE3 which are sequentially enabled for every period of the PRF signal. Their operations will be described below.

First, D flip-flop 802 delays and then outputs a signal applied to its D input for one period of the pulse output from inverter I2. That is, D flip-flop 802 performs the delay of the signal input to the D input port for one period of the PRF signal. D flip-flop 803 delays and then outputs the output of D flip-flop 802 for one period of the output pulse of inverter I2. Negative outputs of D flip-flops 802 and 803 are AND-operated by AND gate AND then are applied to input port D of D flip-flop 802.

Inverter I3 inverts the output of the AND gate. Here, the output of inverter I3 becomes first write enable signal /WE1, the negative output of D flip-flop 802 becomes second write enable signal /WE2, and the negative output of D flip-flop 803 becomes third write enable signal /WE3. The three write enable signals /WE1, /WE2 and /WE3 are OR-operated with write clock WR-CK by OR gates OR1, OR2 and OR3, respectively, so as to be converted into first, second and third write clocks WR-CK1, WR-CK2 and WR-CK3.

Figure 10:
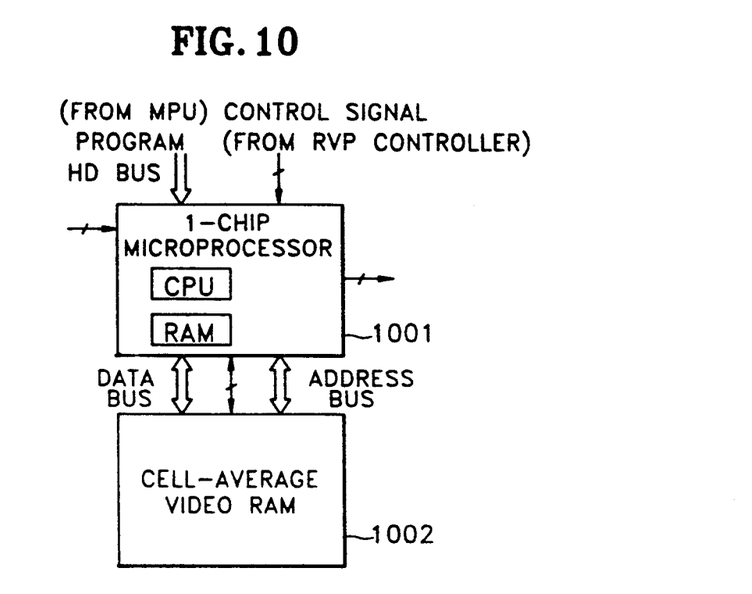
FIG. 10 is a detailed block diagram of the first or second cell average processor shown in FIG. 3.

FIG. 10 is a detailed block diagram of the first cell average processor or the second cell average processor which is shown in FIG. 3. The first or second processor has a one-chip microprocessor 1001 and a cell average video RAM 1002.

The cell average processors perform an algorithm for preventing the increase of a false target detection rate due to spurious noise which may appear in a specific range. In other words, the processors perform an algorithm for keeping the false target generation rate below a predetermined value in spite of the noise. As described with reference to FIG. 2, various methods exist for performing cell averaging, which preferably can be readily modified according to the environment of the radar system so as to enhance its detection capability.

In FIG. 10, one-chip microprocessor 1001 instructs cell average video RAM 1002 to store the radar signal output from multiplexer 607. One-chip microprocessor 1001 is internally equipped with a non-volatile RAM which serves as an operational area when programs are down-loaded and are operated. Here, the data transmission/reception between cell average video RAM 1002 and one-chip microprocessor 1001 is carried out via a data bus and address bus which are controlled by the microprocessor.

Figure 11:
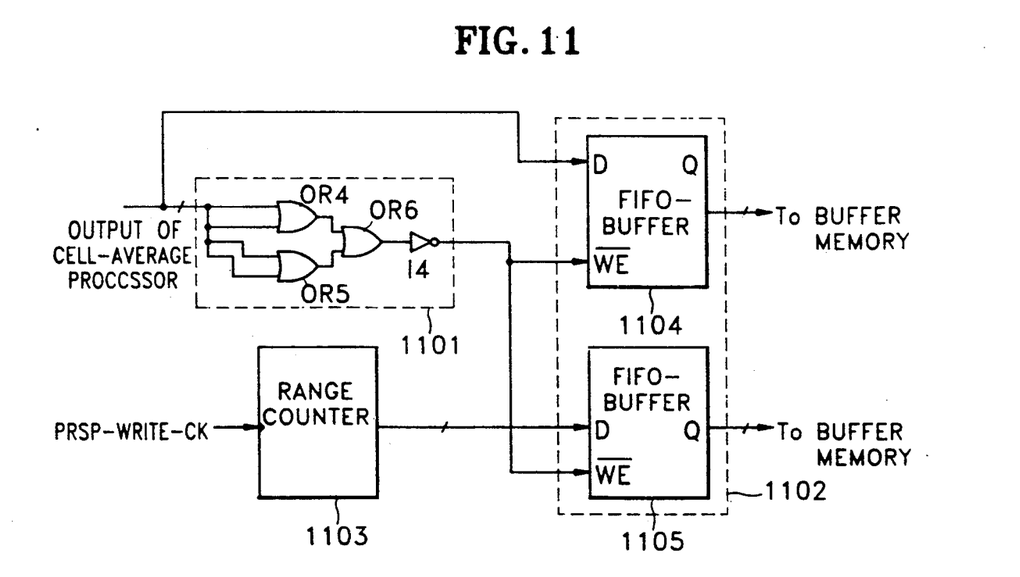
FIG. 11 is a detailed block diagram of the extractor shows in FIG. 3.

FIG. 11 is a detailed block diagram of the target data extractor shown in FIG. 3. The target data extractor comprises a target presence/absence determiner 1101, a target data latch circuit 1102 and a range counter 1103.

In FIG. 11, target presence/absence determiner 1101 determines the presence or absence of target by detecting the outputs of the cell average processor by bits, which is basically an OR gate for performing OR operation. Further explanation about this is described below.

Given that the output of the cell average processor is composed of four bits, when a target is absent, the output is "0000." When a target is present, a logic "1" appears in at least one bit location. Thus, target presence/absence determiner 1101 applies an latch enable signal which is active (this is "low" active in FIG. 11) when the output of the cell average processor is not "0000, " to target data latch circuit 1102.

In FIG. 11, range counter 1103 performs a function to generate range gate values of data output from the cell average processor, which is composed of an ordinary counter.

Meanwhile, target data latch circuit 1102 consists of two latches 1104 and 1105. The input port of one of the latches is connected to the output of the cell average processor. The input port of the other latch is connected to the output of range counter 1103. Here, each latch is composed of a FIFO buffer, since the processing speed of the cell average processor differs from that of the tracking processor.

Thus, as the latch enable signals become active when at least one bit indicates a logic "1" in the output data of the cell average processor, when the output data of the cell average processor is regarded as target data, latches 1104 and 1105 latch the output data of the cell average processor and the range gate value corresponding to the output data. Accordingly, the data regarded as not being a target is deleted. In FIG. 11, a PRSP-WRITE-CK signal is a clock used when the cell average processor outputs data, and range counter 1103 counts the clock pulses.

As described above, the video signal processor for a radar system of the present invention is adaptively operated depending upon the environment of the radar system, to thereby enhance the detection capability thereof.

What is claimed is:

1. A video signal processor for a radar system having a pre-processor for outputting first and second radar signals by removing their respective clutter via different methods, a tracking processor and a scan converter, said video signal processor comprising:

first A/D converting means for receiving said first radar signal and performing analog-to-digital conversion at a predetermined conversion speed;

first direct averaging means for writing signals included in predetermined size of azimuth among said digitized first radar signal into different memories according to the azimuth and for averaging signals corresponding to the same range gates to output;

first cell average processing means having a microcomputer and a RAM for performing cell averaging the output of said first direct averaging means with the processing program down-loaded from a main controller of said radar system;

second A/D converting means for receiving said second radar signal and performing analog-to-digital conversion at a predetermined conversion speed;

second direct averaging means for writing signals included in predetermined size of azimuth among said digitized second radar signal into different memories according to the azimuth and for averaging signals corresponding to the same range gates to output;

second cell average processing means having a microcomputer and a RAM for performing cell averaging the output of said second direct averaging means with the processing program down-loaded from a main controller of said radar system;

extracting means for extracting target data from the output of said second cell average processing means;

radar video processor controlling means commonly connected to each of said means for generating various control signals; and a communication processor connected to said radar video processor controlling means for performing data transmission/reception between the main controller of the radar system and said radar video processor controlling means, the output of said first cell average processing means being applied to the scan converter and the output of said extracting means being applied to the tracking processor.

2. A video signal processor for a radar system as claimed in claim 1, further comprising a first buffer memory for storing the output of said first cell average processing means and outputting the stored output on demand of said scan converter.

3. A video signal processor for a radar system as claimed in claim 1, further comprising a second buffer memory for storing the output of said extracting means and outputting the stored output on demand of said tracking processor.

4. A video signal processor for a radar system as claimed in claim 1, wherein said first A/D converting means comprises:

first frequency dividing means for dividing the frequency of sampling clock by two; and first and second A/D converters operated at different edges of said frequency divided sampling clock, wherein the output signals of said first and second A/D converters are transmitted for every sampling clock pulse via a G bus commonly connected to the output ports of said first and second A/D converters.

5. A video signal processor for a radar system as claimed in claim 1, wherein said second A/D converting means comprises:

second frequency dividing means for dividing the frequency of sampling clock by two; and third and fourth A/D converters operated at different edges of said frequency divided sampling clock, wherein the output signals of said third and fourth A/D converters are transmitted for every sampling clock pulse via a H bus commonly connected to the output ports of said third and fourth A/D converters.

6. A video signal processor for a radar system as claimed in claim 1, wherein said first direct averaging means comprises:

a predetermined number of first PRF video FIFO memory means commonly connected to the G bus for sequentially storing radar signals contained for one period of a PRF signal and outputting the radar signals in the order of their being stored;

first enable signal generating means for receiving the PRF signal so as to generate a plurality of write clock signals which are applied to said first PRF video FIFO memory means and are sequentially enabled for every period of the PRF signal; and first average look-up table means for storing the average of an address divided by a predetermined number of bits, to which data output from said first PRF video FIFO memory means by range gates is applied as an address.

7. A video signal processor as claimed in claim 6, wherein said first direct averaging means further comprises a first multiplexer connected to both the G bus and the output of said first average look-up table means via a buffer, for selecting either the output of said first A/D converting means transmitted via the G bus or the output of said first average look-up table means according to the frequency of the PRF signal.

8. A video signal processor for a radar system as claimed in claim 1, wherein said second direct averaging means comprises:

a predetermined number of second PRF video FIFO memory means commonly connected to the H bus for sequentially storing radar video signals contained for one period of PRF signal and outputting the radar video signals in the order of their being stored;

second enable signal generating means for receiving the PRF signal so as to generate a plurality of write clock signals which are applied to said second PRF video FIFO memory means and are sequentially enabled for every period of the PRF signal; and second average look-up table means for storing the average of an address divided by a predetermined number of bits, to which data output from said second PRF video FIFO memory means by range gates is applied as an address.

9. A video signal processor as claimed in claim 8, wherein said second direct averaging means further comprises a second multiplexer connected to the H bus and at the same time to the output of said second average look-up table means via a buffer for selecting the output of said second A/D converting means transmitted via the H bus or the output of said second average look-up table means according to the frequency of the PRF signal.

10. A video signal processor as claimed in claim 6, wherein said first enable signal generating means comprises:

a PRF-level comparator for receiving a positive PRF signal and negative PRF signal which contain noise and comparing the difference of their levels with a predetermined level, so as to output a digital PRF signal;

first inverting means for inverting the output of said PRF-level comparator;

a first D flip-flop for delaying a signal applied to its D input port for one period of the output pulse of said first inverting means;

a second D flip-flop for delaying the output of said first D flip-flop for one period of the output pulse of said first inverting means;

an AND gate for AND-operating the negative output of said first D flip-flop and the negative output of said second D flip-flop, so as to apply the result to the D input port of said first D flip-flop; and second inverting means for inverting the output of said AND gate, the output of said second inverting means, the negative output of said first D flip-flop and the negative output of said second D flip-flop being applied, as first, second and third enable signals, respectively, to the write enable ports of the plurality of PRF video FIFO memory means.

11. A video signal processor for a radar system as claimed in claim 10, wherein said first enable signal generating means further comprises first, second and third OR gates for OR-operating the first, second and third enable signals, respectively, with a write clock which can be applied to said radar video processor controlling means, so as to generate first, second and third write signals, and then applying the write signals to respective write clock ports of the plurality of PRF video FIFO memory means.

12. A video signal processor as claimed in claim 8, wherein said second enable signal generating means comprises:

a PRF-level comparator for receiving a positive PRF signal and negative PRF signal which contain noise and comparing the difference of their levels with a predetermined level, so as to output a digital PRF signal;

first inverting means for inverting the output of said PRF-level comparator;

a first D flip-flop for delaying a signal applied to its D input port for one period of the output pulse of said first inverting means;

a second D flip-flop for delaying the output of said first D flip-flop for one period of the output pulse of said first inverting means;

an AND gate for AND-operating the negative output of said first D flip-flop and the negative output of said second D flip-flop, so as to apply the result to the D input port of said first D flip-flop; and second inverting means for inverting the output of said AND gate, the output of said second inverting means, the negative output of said first D flip-flop and the negative output of said second D flip-flop being applied, as first, second and third enable signals, respectively, to the write enable ports of the plurality of PRF video FIFO memory means.

13. A video signal processor for a radar system as claimed in claim 12, wherein said second enable signal generating means further comprises first, second and third OR gates for OR-operating the first, second and third enable signals, respectively, with a write clock which can be applied to said radar video processor controlling means, so as to generate first, second and third write signals, and then applying the write signals to respective write clock ports of the plurality of PRF video FIFO memory means.

14. A video signal processor for a radar system as claimed in claim 1, wherein said extracting means comprises:

target presence/absence determining means for detecting by bits the output of said second cell average processor, so as to generate the signal representing the presence or absence of a target;

first latching means for latching the output of said second cell average processor according to the output signal of said target presence/absence determining means;

range counting means for generating the range gate value of data output from said second cell average processor; and second latching means for latching the output of said range counting means according to the output signal of said target presence/absence determining means.

* * * * *